Dec. 21, 1926.  1,611,325
A. H. TASHJIAN
COMBINATION METAL BASE, ELECTRIC CONDUIT, AND CONTINUOUS OUTLET BOX
Filed March 24, 1922
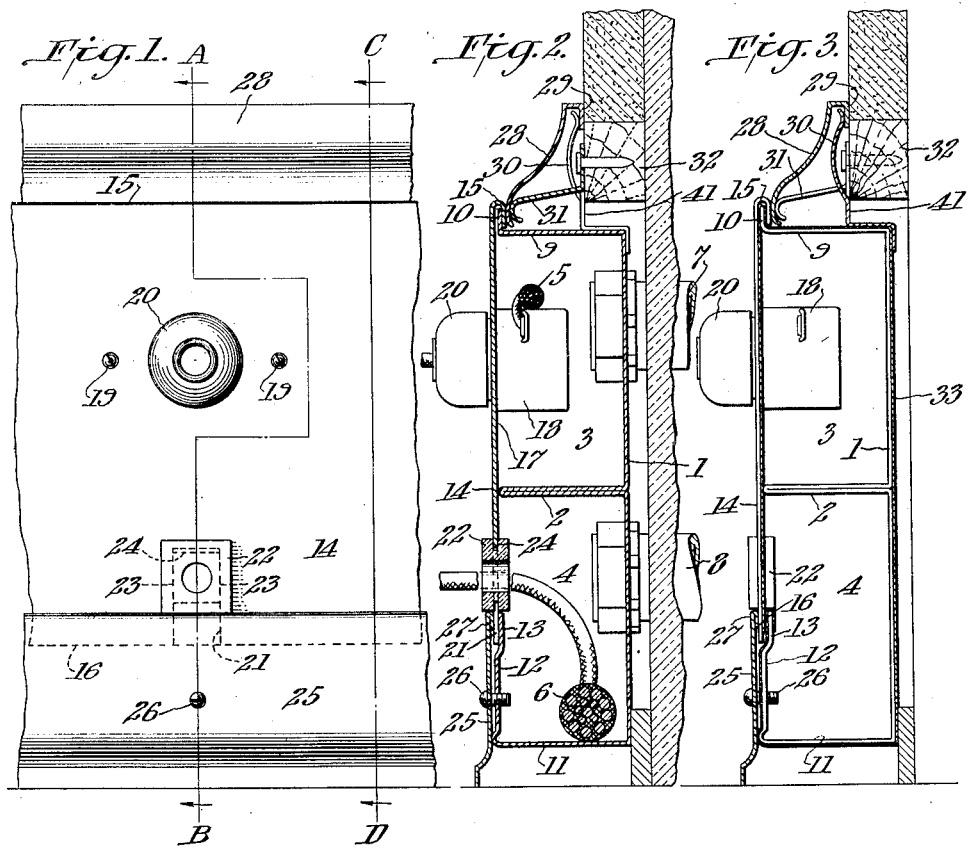

Patented Dec. 21, 1926.

1,611,325

UNITED STATES PATENT OFFICE.

ARMEN H. TASHJIAN, OF CLEVELAND, OHIO.

COMBINATION METAL BASE, ELECTRIC CONDUIT, AND CONTINUOUS OUTLET BOX.

Application filed March 24, 1922. Serial No. 546,436.

This invention relates to means for enabling a constructor to locate electric appliances or apparatus at any desired point in accordance with the wishes or purposes of a tenant, and to this end is used a metal base, serving as a baseboard, in the construction of buildings, this base being constructed to serve the purposes of a base as such, a conduit for electric conductors in which, for example, high tension and low tension conductors are separated, and a continuous outlet box, for both kinds of conductors, in such way that outlets may be provided at any point with a minimum of cutting and without disfiguring the base.

The present invention is in the nature of an improvement upon the inventions in my Patent No. 1,437,324 granted November 28, 1922, and the invention consists in a removable face plate for such bases having means by which the face plate may be detached without disconnecting the conductors from the receptacles within, or disconnecting the low tension system or wire extensions, as I will proceed now to explain and finally claim.

In the accompanying drawings illustrating the invention, in the several figures of which like parts are similarly designated, Figure 1 is a front elevation of a fragment of the article. Fig. 2 is a vertical section taken in the plane of line A—B, and showing the wire installation. Fig. 3 is a vertical section taken in the plane of line C—D, Fig. 1, but omitting the wire installation. Fig. 4 is a perspective view of a portion of the face plate. Fig. 5 is a perspective view of a wiring bushing.

The back 1 is of metal bent upon itself, as at 2, to form two compartments or raceways 3 and 4 for the reception and separation of different classes of conductors, as, for example, high tension wires 5 and low tension wires 6, which may be introduced therein through suitable conduits 7 and 8. The top 9 of the back is extended forward and provided with a front vertical flange 10, and the bottom 11 of the back is also extended forward and provided with a vertically extending flange 12 having its upper edge offset as at 13. This back is attached to a wall in any suitable way to form the base.

14 is a face plate having the overturned lip 15, which is adapted to hook over the flange 10, and its lower edge 16 is adapted to fit in the offset portion 13 of the bottom flange, so that this face plate is removable at pleasure from the back, whenever it is desired to obtain access to the conductors or the interior of the base or to provide it with outlets, as desired. As shown, a cut 17 may be made in this face plate at any point to receive a receptacle 18 as may be required for the purpose of leading out the conductors. This receptacle may be detachably applied to the face plate by screws 19 or other suitable means. 20 is a wiring plug of any suitable construction and capable of being disconnected from the receptacle at pleasure so as not to disturb the wiring in the conduits whenever it is desired to remove or detach the face plate. As will be seen, the plate 14 covers and encloses the receptacle 18. A notch 21 may be made in the bottom of the face plate at any point to receive a bushing 22, which, as shown in Fig. 5, may be of any suitable material and provided with the parallel grooves 23 and the top groove 24 to engage the adjacent edges of the notch 21. This bushing may have a slip fit with the face plate or be otherwise secured therein, so that when the face plate is to be removed the bushing will slip out of the notch and thus leave the wiring undisturbed.

These features of the undisturbing of the wiring when it is desired to remove the face plate, are distinguishing characteristics of the present invention.

The back plate is provided with a floor molding 25 extending from the floor up to the upper edge of the flange 12, and with the offset portion 13 of said flange forms a pocket for the reception of the lower edge of the face plate. This molding may be secured to the flange 12 by screws 26 or otherwise, as desired. Preferably, for finish and reinforce, the upper edge of the molding may be folded over backward as shown at 27.

The upper finish consists of a molding 28 rendered more or less elastic by means of its lip 29 engaging springs 30 of the clip 41 and its lower edge fitting back of the hooked end 15 of the face plate and engaged by the springs 31 of the clip 41, which clip 41 is fastened to the plaster ground 32 and attached to the back.

The face plate and its moldings may be finished to suit the woodwork or other finish of the room in which it is located, but I prefer to make the mop or floor molding 25 of bronze, so as to resist wear and corrosion.

The base may be made in sections, and these sections connected by sleeves 33 arranged exteriorly at the joints.

Thus is provided a combination metal base, electric conduit for high and low tension wires, and a continuous electric outlet box. As a base, it is handsome and sanitary, and may be, as stated, finished to match any wood, marble, or metal. The bronze mop molding or mould prevents constant rubbing off of the finish on the base when the floors are cleaned and is not corrodible. As an electric device, it provides two large concealed raceways for high and low tension wires, easily accessible by simply removing the base front or face plate. As an outlet box it makes it possible to place a number of electric receptacles and low tension current outlets at any point of the base and at any time desired, with a minimum of labor. It is possible to extend the conduits into the base at any convenient point, and any number of outlets for fans, desk lights, dictaphone motors, telephones, call bells, buzzers and other electric apparatus may be installed and connected at any desired points, wherever and whenever wanted, without disturbing the connections already in place.

The invention is susceptible of variations in the details of construction to meet the requirements of installation and of architects and builders, within the spirit and scope of the claims following.

What I claim is:—

1. A combination metal base, electric conduit and continuous outlet box, having a fixed body portion provided with compartments for receiving electric conductors of different type, and a face-plate therefor detachably applied to the back and having outlets when and where desired, and means for supporting leading-out wires from said conductors, said means being bodily separable from the face plate, whereby the face plate may be detached without disconnecting the leading-out wires from the conductors in the compartments.

2. A combination metal base, electric conduit and continuous outlet box, comprising a back divided into a plurality of compartments to form raceways for electric conductors of different type, and having a detachable face plate provided with any number of receptacles arranged therein when and where desired, a separable leading-out connection for each receptacle for wires of one type, and bushings slidably connected with the face plate and bodily separable therefrom as the face plate is detached and adapted to receive leading-out wires from the conductors of another type, whereby the face plate may be detached without disturbing the conductors in the compartments and without disconnecting the conductors from the receptacles within.

3. A combination metal base, electric conduit and continuous outlet box, comprising a metallic back divided into a plurality of compartments to receive conductors of different type, and having a detachable face plate, said face plate having notches adjacent to one of the compartments, and bushings slidably and separably arranged in said notches and adapted to receive leading-out wires and to separate them from the face plate when it is detached.

In testimony whereof I have hereunto set my hand this 18th day of March, A. D. 1922.

ARMEN H. TASHJIAN.